United States Patent [19]

Nishida et al.

[11] Patent Number: 5,140,571
[45] Date of Patent: Aug. 18, 1992

[54] DISK DRIVE APPARATUS WITH INTERMITTENTLY OPERTATED SERVO SIGNAL PROCESSOR FOR LOW POWER CONSUMPTION

[75] Inventors: Norio Nishida; Katsuhiro Nakano, both of Kanagawa, Japan

[73] Assignee: Sony Corporation, Tokyo, Japan

[21] Appl. No.: 707,057

[22] Filed: May 29, 1991

[30] Foreign Application Priority Data

May 30, 1990 [JP] Japan .................................. 2-140555

[51] Int. Cl.[5] .............................................. G11B 7/00
[52] U.S. Cl. ............................ 369/44.11; 360/77.11; 360/77.02; 360/78.14; 369/44.26
[58] Field of Search ............... 369/44.11, 44.26, 44.27, 369/44.28, 44.29, 44.32, 44.35, 44.36, 43, 32, 47, 50; 360/39, 51, 61, 77.02, 77.04, 77.05, 77.11, 78.04, 78.14

[56] References Cited

U.S. PATENT DOCUMENTS

| | | | |
|---|---|---|---|
| 4,646,279 | 2/1987 | Yonezawa | 369/44.26 |
| 4,811,126 | 3/1989 | Suzuki et al. | 360/51 |
| 4,819,103 | 4/1989 | Okamura | 360/51 |
| 4,964,109 | 10/1990 | Yoshioka | 369/44.11 |
| 4,967,403 | 10/1990 | Ogawa et al. | 369/44.26 |
| 5,019,816 | 5/1991 | Hosono | 360/51 |

Primary Examiner—Roy N. Envall, Jr.
Assistant Examiner—Thai Tran
Attorney, Agent, or Firm—Alvin Sinderbrand; William S. Frommer

[57] ABSTRACT

A disk drive apparatus which consumes less power to control the movement of a head on the basis of servo signals which are intermittently reproduced from a disk-like recording medium has a servo signal processing circuit driven by a clock signal for generating a head control signal from the servo signals which are intermittently reproduced from the disk-like recording medium and for generating a processing period signal indicative of a processing period in which the servo signals are being processed, a head driving circuit to control the movement of the head on the basis of the head control signal, a clock generator to supply the clock signal, a servo signal reproduction detecting circuit to detect a servo signal reproducing interval in which the servo signals are being reproduced form the disk-like recording medium, and a circuit to control the supply of the clock signal to the servo signal processing circuit on the basis of detection of the servo signal reproducing interval by the servo signal reproduction detecting circuit and the processing period signal from the servo signal processing circuit.

5 Claims, 2 Drawing Sheets

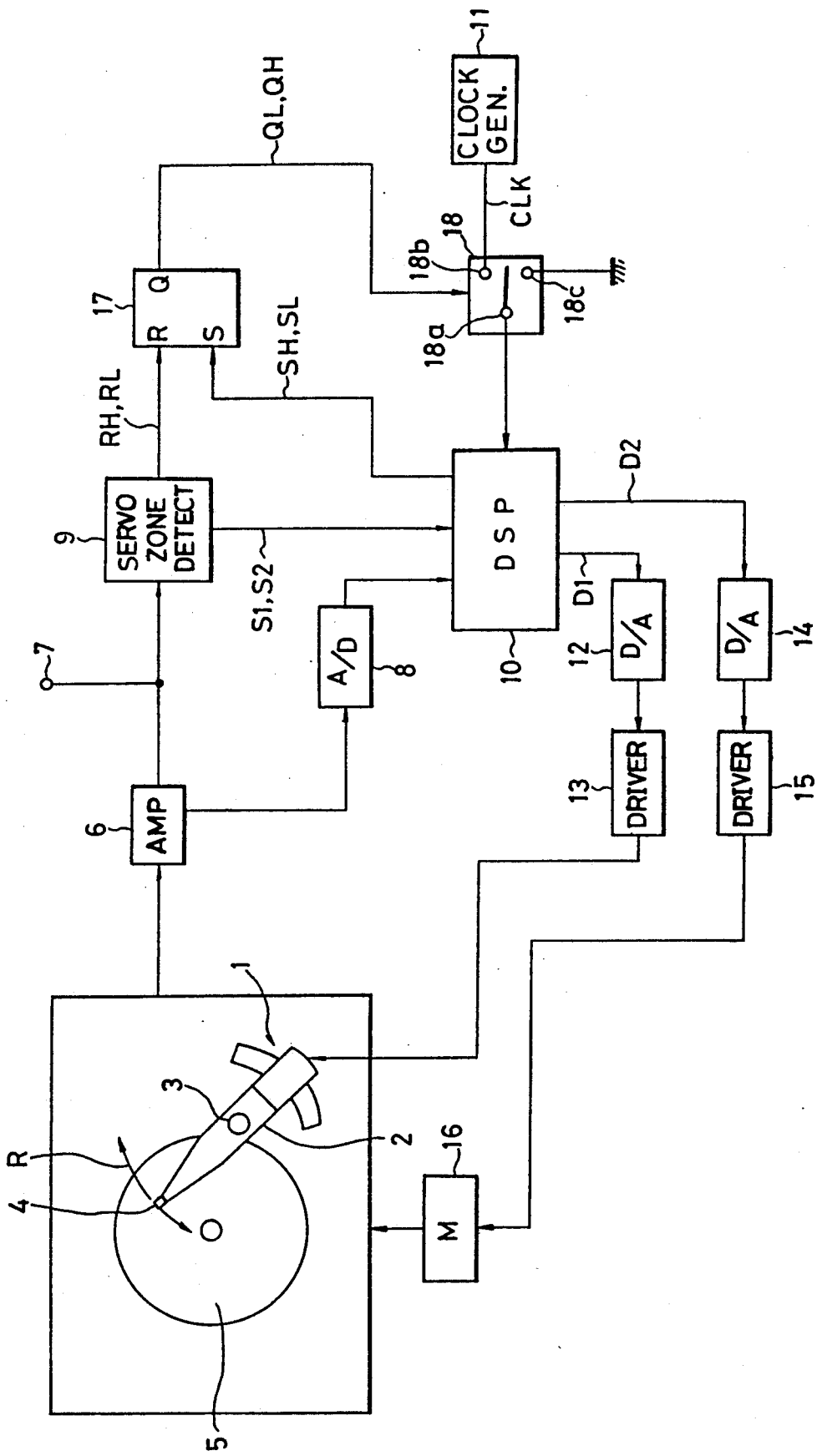

DISK DRIVE APPARATUS WITH INTERMITTENTLY OPERTATED SERVO SIGNAL PROCESSOR FOR LOW POWER CONSUMPTION

BACKGROUND OF THE INVENTION

1. Field of the Invention

The present invention relates to a disk drive apparatus and, more particularly, to a disk drive apparatus used with a sector servo system.

2. Description of the Prior Art

A sector servo system is one of the systems for controlling the movement of a disk-drive head on the basis of servo signals recorded on a disk-like recording medium and which are intermittently reproduced therefrom.

In a sector server system, servo signals which are intermittently obtained from servo signal recording regions formed radially on a magnetic disk at equal angle intervals are processed by a servo signal processing circuit for executing control operations such as a seeking operation of a magnetic head, tracking operation, and the like.

Hitherto, an analog circuit such as an operational amplifier or the like has been used as the above servo signal processing circuit.

In recent years, however, an advanced control technique has become required due to a higher density and a larger capacity of the recording media. To realize such an advanced control technique, high speed digital arithmetic operating processing using a DSP (Digital Signal Processor) is needed.

The DSP executes arithmetic operating processing at a high speed. With respect to a point on a gate scale, that is, a fraction of the gates which the DSP occupies in the whole circuit in the disk drive apparatus, for instance, the hard disk drive apparatus, is large, so that there is generally a problem in that the electric power consumption is large.

That is, the large electric power consumption of the DSP results in a large electric power consumption of the hard disk drive apparatus.

As a future trend, it is considered that small hard disk drive apparatus will be further widely used in portable personal computers, word processors, or the like. For this purpose, the realization of a low electric power consumption of the servo signal processing circuit, practically speaking, the DSP, is demanded.

OBJECT AND SUMMARY OF THE INVENTION

It is, therefore, an object of the present invention to provide a disk drive apparatus with low electric power consumption.

According to an aspect of the invention, there is provided a disk drive apparatus for controlling a movement of a head on the basis of servo signals which are intermittently reproduced from a disk-like recording medium, comprising: servo signal processing means adapted to be driven by a clock signal of a predetermined frequency for generating a head control signal by processing said servo signals which are intermittently reproduced from the disk-like recording medium and for generating a processing period signal indicative of a period in which the servo signal processing means is processing said servo signals; head driving means for controlling the movement of the head on the basis of the head control signal; clock generating means for generating said clock signal of said predetermined frequency; servo signal reproduction detecting means for detecting a servo signal reproducing interval in which the servo signals are being reproduced from the disk-like recording medium; and means for controlling supplying of the clock signal to the servo signal processing means on the basis of detection of the servo signal reproducing interval by the servo signal reproduction detecting means and said processing period signal from the servo signal processing means.

The above and other objects, features, and advantages of the present invention will become readily apparent from the following detailed description thereof which is to be read in connection with the accompanying drawings.

BRIEF DESCRIPTION OF THE DRAWINGS

FIG. 1 is a block diagram of a disk drive apparatus with which the invention is used.

DETAILED DESCRIPTION OF THE PREFERRED EMBODIMENT

An embodiment of the invention will now be described with reference to FIGS. 1 and 2. In the embodiment, a magnetic disk will be used as an example of a disk-like recording medium.

Since the embodiment uses a sector servo system, a data zone ZD and a servo zone ZS will now be described with reference to FIGS. 1 and 2.

Since the data zones ZD and the servo zones ZS are alternately arranged on a magnetic disk 5 shown in FIG. 1, a servo signal is reproduced only when a magnetic head 4 is located over the servo zone ZS.

Figure 2:
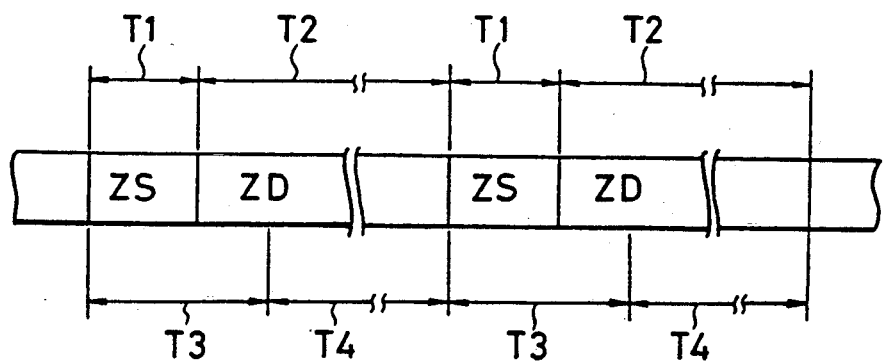
FIG. 2 is a schematic diagram for explaining the supply of a clock signal to a DSP.

FIG. 2 diagrammatically shows the servo signals which are reproduced from the servo zones ZS and data signals which are read out of the data zones ZD sequentially in time.

As shown in FIG. 2, for a period T1, the magnetic head 4 is located over the servo zone ZS. For a period T2, the magnetic head 4 is located over the data zone ZD. During a period T3, a DSP 10 executes signal processing on the basis of the reproduced servo signals. During a period T4, the DSP 10 does not execute the above signal processing.

In the apparatus of FIG. 1, a rotary arm 2 is rotated around an axis 3 as a rotational center by a voice coil motor 1. The magnetic head 4 attached to a tip portion of the arm 2 is moved in the radial directions (directions indicated by arrows R in FIG. 1) across the magnetic disk 5.

A reproduction output from the magnetic head 4 is supplied through a head amplifier 6 to a terminal 7, an A/D converter 8, and a servo zone detecting circuit 9. The terminal 7 is connected to a circuit (not shown) to process the data signals recorded in the data zones ZD.

The A/D converter 8 converts the reproduction output from the magnetic head 4 into a digital signal and supplies it to the DSP 10 adapted to function as a servo signal processing circuit.

The servo zone detecting circuit 9 discriminates whether or not the magnetic head 4 is located in the servo zone ZS on the basis of the reproduction output from the magnetic head 4.

In the period T1, the servo zone detecting circuit 9 detects that the magnetic head 4 has entered the servo zone ZS. Therefore, a signal S1 indicating that the magnetic head 4 has entered the servo zone ZS is supplied from the servo zone detecting circuit 9 to the DSP 10.

On the other hand, in the period T2, the servo zone detecting circuit 9 detects that the magnetic head 4 has left the servo zone ZS. Therefore, a signal S2 indicating that the magnetic head 4 has left the servo zone ZS is supplied from the servo zone detecting circuit 9 to the DSP 10.

In the period T3, a clock signal CLK of a predetermined frequency is supplied from a clock generating circuit 11 to the DSP 10 as will be explained below. Therefore, the DSP 10 executes signal processing on the reproduced servo signal. That is, in the period T3, the DSP 10 performs the signal processing to control the movement of the magnetic head 4 at the timing of the clock signal CLK on the basis of the reproduced servo signal. In addition, the DSP 10 also executes the signal processing to control a rotational speed of the magnetic disk 5 to a constant speed.

Thus, data D1 for the control of the seeking operation to move the magnetic head 4 to a target track and the control of the tracking operation to allow the magnetic head 4 to follow the target track are obtained.

In the period T3, the DSP 10 executes the signal processing to control the rotational speed of the magnetic disk 5 to a constant speed at the timing of the clock signal CLK, so that data D2 is derived.

In the period T4, no signal processing is executed by the DSP 10. As will be explained below, since no clock signal CLK is supplied to the DSP 10, although the DSP 10 holds the data D1 and D2 as results of the signal processing in the period T3, the signal processing of the DSP 10 is stopped.

Therefore, for the period when the clock signal CLK is not supplied to the DSP 10, the seeking and tracking control operations and the control operation to make a rotational speed of a spindle motor 16 constant are executed using the data D1 and D2 which are held as results of the signal processing.

The data D1 is supplied to a D/A converter 12 and the data D2 is supplied to a D/A converter 14.

The D/A converter 12 converts the data D1 into an analog signal and supplies it to a driver circuit 13.

The driver circuit 13 drives and controls the voice coil motor 1 on the basis of the data D1 which has been converted into the above analog signal. Due to this, the magnetic head 4 of the rotary arm 2 is moved over the magnetic disk 5 in the directions shown by the arrows R and control operations such as a seeking operation, tracking operation, and the like mentioned above are executed.

The D/A converter 14 converts the data D2 into an analog signal and supplies it to a driver circuit 15.

The driver circuit 15 drives and controls the spindle motor 16 on the basis of the data D2 which has been converted into the above analog signal. Thus, the control operation to make the rotational speed of the magnetic disk 5 constant is executed.

The supplying of the clock signal CLK to the DSP 10 and the cessation of the supplying of the clock signal CLK will now be described.

In the period T1 when the magnetic head 4 is located over the servo zone ZS shown in FIG. 2, the signal S1 is supplied from the servo zone detecting circuit 9 to the DSP 10. A signal RH at the high level ("1") indicating that the servo zone ZS has been detected is supplied to a reset terminal of a flip-flop 17.

In the period T1, since the signal processing has already been performed by the DSP 10, a signal SL at the low level ("0") indicative of the period T3 when the signal processing is being executed is supplied from the DSP 10 to a set terminal of the flip-flop 17. The signal SL is set to the signal SH at the high level ("1") after completion of the signal processing in the DSP 10.

In the period T1, the signal RH at the high level ("1") is supplied to the reset terminal of the flip-flop 17 and the signal SL at the low level ("0") is supplied to the set terminal. Therefore, a control signal QL at the low level ("0") is supplied from an output terminal of the flip-flop 17 to a switch 18.

A time interval from the endpoint of the period T1 to the endpoint of the period T3 as shown in FIG. 2 is a period of time when the magnetic head 4 is not located over the servo zone ZS and the signal processing is being executed by the DSP 10. Therefore, since the signals RL and SL at the low level ("0") are supplied to the reset terminal and the set terminal of the flip-flop 17, the control signal QL at the low level ("0") is successively supplied to the switch 18 from the output terminal of the flip-flop 17.

The switch 18 is controlled by the control signals QH and QL. Terminals 18a and 18b of the switch 18 are connected in response to the control signal QL at the low level ("0"). Terminals 18a and 18c are connected in response to the control signal QH at the high level ("1").

In the period T3 when the DSP 10 is executing the arithmetic operating processing, therefore, the control signal QL at the low level ("0") is supplied from the output terminal of the flip-flop 17 to the switch 18. Thus, the clock signal CLK which is generated from the clock generating circuit 11 is supplied to the DSP 10 through the switch 18.

For a period of time when the clock signal CLK is supplied to the DSP 10, the ordinary servo signal processing is performed and the seeking control operation and the tracking control operation and the control operation to make the rotational speed of the spindle motor 16 constant are executed.

In the period T2 when the magnetic head 4 is located over the data zone ZD shown in FIG. 2, the signal S2 is supplied from the servo zone detecting circuit 9 to the DSP 10. The signal RL at the low level ("0") indicating that the servo zone ZS is not detected is supplied to the reset terminal of the flip-flop 17.

In the period T4, which starts with a time delay after the period T2 starts, since the signal processing has already finished in the DSP 10, the signal SH at the high level ("1") indicative of the completion of the signal processing is supplied from the DSP 10 to the set terminal of the flip-flop 17 as mentioned above.

In the period T4 when no signal processing is performed in the DSP 10, therefore, the signal RL at the low level ("0") is supplied to the reset terminal of the flip-flop 17 and the signal SH at the high level ("1") is supplied to the set terminal. Therefore, the control signal QH at the high level ("1") is supplied from the output terminal of the flip-flop 17 to the switch 18.

In the period T4 when the DSP 10 does not execute arithmetic operating processing, therefore, the control signal QH at the high level ("1") is supplied from the output terminal of the flip-flop 17 to the switch 18, so that the terminals 18a and 18c are connected.

Since the terminal 18c of the switch 18 is connected to a ground, the clock signal CLK which is generated from the clock generating circuit 11 is not supplied to the DSP 10. Thus, although the DSP 10 holds the data D1 and D2 as results of the signal processing for the period T3, the signal processing operation is stopped.

In the period when the clock signal CLK is not supplied to the DSP 10, accordingly, the seeking control operation and the tracking control operation and the control operation to make the rotational speed of the spindle motor 16 constant are executed using the data D1 and D2 which are held as results of the signal processing.

According to the present embodiment, the clock signal CLK is supplied only for the period T3 when signal processing is being executed by the DSP 10. For the period T4 when signal processing is not performed in the DSP 10, the clock signal CLK is not supplied to the DSP 10 and the signal processing operation of the DSP 10 is stopped, so that electric power consumption of the DSP 10 can be reduced. Thus, electric power consumption of the disk drive apparatus can be reduced.

Although the present embodiment has been described with respect to an example in which the magnetic disk 5 is used by the sector servo system, the invention is not limited to such an example. The invention can be also applied to a magnetooptic disk using a servo system in which servo signals are intermittently obtained, for instance, a sample format servo system in which wobbling pits are provided.

Although the present embodiment has been described with respect to the DSP 10 as an example of the servo signal processing circuit, the invention is not limited to such an example. The invention can be also applied to the case where a CPU is used as a servo signal processing circuit.

Figure 1A:
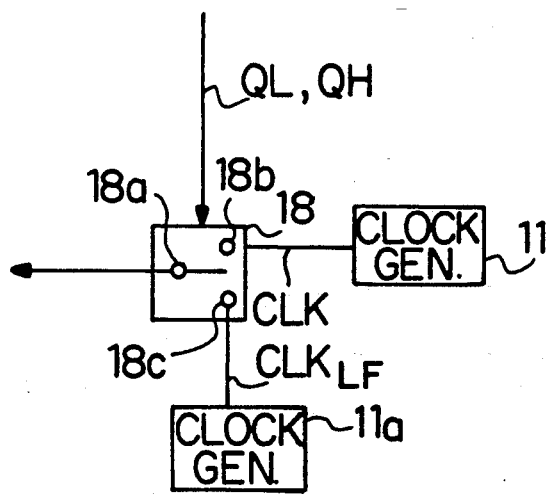
FIG. 1A is a diagram showing an alternative arrangement for clock signal supplying in the apparatus of FIG. 1.

Further, although the present embodiment has been described with respect to an example in which the supply of the clock signal CLK is stopped, the invention is not limited to such an example. It is also possible to set the frequency of the clock signal CLK to a lower frequency and to subsequently supply the low frequency clock signal CLK for a period of time when the signal processing is not executed. FIG. 1A shows an arrangement where switch 18 supplies either a clock signal CLK from the clock generating circuit 11, or a clock signal $CLK_{LF}$, having a lower frequency than the frequency of the clock signal CLK, from a second clock generating circuit 11a. For example, in the case of setting the frequency of the ordinary clock signal CLK to 20 MHz, the lower frequency of the clock signal $CLK_{LF}$ in the invention can be set to about 100 kHz and such a low-frequency clock signal can be also used.

According to the disk drive apparatus of the present invention, in the period when the servo signal, processing circuit does not execute any signal processing, the supply of the clock signal is stopped or a clock signal set to a low frequency is supplied. Therefore, there is an effect such that the electric power consumption of the servo signal processing circuit can be reduced, so that the electric power consumption of the disk drive apparatus can be reduced. On the other hand, unlike a system which merely turns off the power source, the present invention allows the results of the signal processing to be held. Therefore, even in the period when the servo signal processing circuit does not execute any signal process, there is an advantage in that the seeking control operation and the tracking operation and the control operation to make the rotational speed of the spindle motor 16 constant can be performed using the data D1 and D2 which are held as results of the signal processing.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. In a reproducing apparatus for use with a disk-like recording medium having interspersed servo and information signal zones in which servo and information signals, respectively, are recorded, and which includes a reproducing head mounted for movement so as to scan said servo and information signal zones alternatively and which provides a reproduced head output which contains reproduced servo signals and reproduced information signals while said head scans said servo and information signals zones, respectively; a device for controlling said movement of the head, comprising:

servo signal processing means operative in response to a clock signal of a predetermined frequency for processing said reproduced servo signals contained in said head output and thereby generating a head control signal and for generating a processing period signal indicative of a processing period in which said servo signal processing means is processing said reproduced servo signals, said servo signal processing means ceasing said processing in the absence of said clock signal of said predetermined frequency;

head driving means for controlling the movement of said head on the basis of said head control signal;

clock generating means for generating said clock signal of said predetermined frequency;

servo signal detecting means for detecting a servo signal reproducing interval in which said servo signals are contained in said head output reproduced from the disk-like recording medium and for generating a servo reproducing interval signal indicative of said servo signal reproducing interval; and control means for supplying said clock signal to said servo signal processing means during a supplying period beginning when said servo reproducing interval signal indicates said servo signals are contained in said head output and ending when said processing period signal indicates said servo signal processing means is no longer processing said reproduced servo signals.

2. An apparatus according to claim 1, wherein said servo signal processing means comprises a digital signal processor.

3. An apparatus according to claim 1, wherein said control means supplies a clock signal at a frequency lower than said predetermined frequency to said servo signal processing means during a reduced power period beginning when said processing period signal indicates said servo signal processing means is no longer processing said reproduced servo signals and ending when said servo reproducing interval signal indicates said servo signals are contained in said head output.

4. An apparatus according to claim 1, wherein said control means supplies a ground level signal to said servo signal processing means during a reduced power period beginning when said processing period signal indicates said servo signal processing means is no longer processing said reproduced servo signals and ending when said servo reproducing interval signal indicates said servo signals are contained in said head output.

5. An apparatus according to claim 1, wherein said servo signal processing means further operates to hold results of said processing of said servo signals at a termination of said processing period, and to generate said head control signal based on said results held at said termination.

* * * * *